US012356958B2

(12) United States Patent
Edwards

(10) Patent No.: US 12,356,958 B2
(45) Date of Patent: Jul. 15, 2025

(54) APPARATUS AND METHODS FOR IMPROVING SAFETY OF A PET DURING TRAVEL

(71) Applicant: JME Products, LLC, Tucson, AZ (US)

(72) Inventor: Jason Edwards, Tucson, AZ (US)

(73) Assignee: JME Products, LLC, Tucson, AZ (US)

( * ) Notice: Subject to any disclaimer, the term of this patent is extended or adjusted under 35 U.S.C. 154(b) by 0 days.

(21) Appl. No.: 18/260,445

(22) PCT Filed: Jan. 5, 2022

(86) PCT No.: PCT/US2022/011346
§ 371 (c)(1),
(2) Date: Jul. 5, 2023

(87) PCT Pub. No.: WO2022/150410
PCT Pub. Date: Jul. 14, 2022

(65) Prior Publication Data
US 2024/0049678 A1    Feb. 15, 2024

Related U.S. Application Data

(60) Provisional application No. 63/134,065, filed on Jan. 5, 2021.

(51) Int. Cl.
*A01K 1/02*    (2006.01)
(52) U.S. Cl.
CPC ................. *A01K 1/0272* (2013.01)

(58) Field of Classification Search
CPC .... A01K 1/0263; A01K 1/0272; A01K 1/035; B60N 2/28
See application file for complete search history.

(56) References Cited

U.S. PATENT DOCUMENTS

| 4,860,689 | A | | 8/1989 | Stewart | |
|---|---|---|---|---|---|
| 5,487,588 | A | * | 1/1996 | Burleigh | B60N 2/28 297/253 |
| 5,779,320 | A | * | 7/1998 | Corrales | A47C 31/00 297/487 |
| 6,591,787 | B1 | * | 7/2003 | Gantz | A01K 15/04 119/771 |
| 7,204,205 | B2 | | 4/2007 | O'Donnell | |
| 7,383,789 | B2 | | 6/2008 | Wilkes | |

(Continued)

OTHER PUBLICATIONS

Patent Cooperation Treaty, International Search Report and Written Opinion, International Application No. PCT/US2022/011346, date of mailing Mar. 25, 2022, 10 pages.

*Primary Examiner* — Joshua J Michener
*Assistant Examiner* — Henry Hooper Mudd
(74) *Attorney, Agent, or Firm* — Polsinelli PC

(57) ABSTRACT

An apparatus for improving the safety of a pet during travel is disclosed. The apparatus includes a body with a base defined along the bottom side of the body. A back support is defined along a back side of the body opposite a front side. A cradle is removably positioned along the base and configured to support a general torso portion of a pet, with the cradle defining an inclined surface between the front side and the back side. The apparatus includes an adjustment system defined along the base and the cradle that adjusts a profile of the body to accommodate pets of varying sizes.

14 Claims, 15 Drawing Sheets

(56) References Cited

U.S. PATENT DOCUMENTS

| | | | |
|---|---|---|---|
| 7,886,694 B2* | 2/2011 | Jakubowski | A01K 29/00 |
| | | | 119/28.5 |
| 2007/0157891 A1* | 7/2007 | Wayn | B60R 22/00 |
| | | | 119/771 |
| 2009/0234542 A1* | 9/2009 | Orlewski | B60R 21/02 |
| | | | 701/45 |
| 2018/0325081 A1 | 11/2018 | Lee et al. | |
| 2019/0104702 A1 | 4/2019 | Edwards | |

* cited by examiner

APPARATUS AND METHODS FOR IMPROVING SAFETY OF A PET DURING TRAVEL

CROSS REFERENCE TO RELATED APPLICATIONS

This is a PCT application that claims benefit to U.S. provisional application Ser. No. 63/134,065 filed on Jan. 5, 2021 which is incorporated by reference herein in its entirety.

FIELD

The present disclosure generally relates to apparatuses and methods for the security and safety of a pet; and, more particularly, to a safety apparatus and methods for improving the safety of a pet during travel comprising at least a base, a cradle positioned along the base for cradling a torso of the pet, and a back support for supporting a rear portion of the pet.

BACKGROUND

Conventional apparatuses, devices, or systems for transportation of a pet may include pet car seats, pet safety seats, general pet carriers, and the like. However, it is believed that conventional systems are generally insufficient for maintaining a pet in place relative to a portion of a vehicle or otherwise, and that conventional systems fail to provide adequate safety and comfort to the pet during travel. For example, conventional dog car seats may merely involve strapping the dog to the seat of an automobile. Yet, as may be expected during travel, the dog may be subjected to random and unpredictable forces stemming from a crash or sudden movement of the automobile. Such unexpected forces may loosen the straps and pull the dog from the surface of the seat. In addition, such forces may be of sufficient strength to shift the position of the dog relative to the seat which may increase anxiety and negatively affect the comfort level of the dog during travel. More substantial movement of the dog relative to the seat may leave the dog flailing about and can result in injury.

It is with these observations in mind, among others, that various aspects of the present disclosure were conceived and developed.

SUMMARY

One implementation of the present disclosure may take the form of an apparatus for improving the safety of a pet during travel, comprising a body defining a front side, a back side opposite the front side, a top side, a bottom side opposite the top side, and lateral sides including a first lateral side adjacent the front side and a second lateral side opposite the first lateral side. In some examples, the body comprises a base defined along the bottom side of the body, a back support defined along a back side of the body opposite the front side, a cradle positioned along the base configured to support a general torso portion of a pet, the cradle defining an inclined surface between the front side and the back side, and an adjustment system defined along the base and the cradle that adjusts a profile of the body to accommodate pets of varying sizes.

Another implementation of the present disclosure may take the form of a method of making an apparatus for improving the safety of a pet during travel, comprising the steps of providing a base, defining a back support along the base, removably coupling a cradle to a predetermined position along a top surface of the base, the cradle including an inclined portion and configured to support a general torso portion of a pet, and providing an adjustment system along the cradle and the base that adjusts a profile of the body to accommodate pets of varying sizes.

The aforementioned method may further include the step of adjusting one or more pad configurations defined by the adjustment mechanism by adding or removing a pad along a slot defined by a groove formed along the cradle.

The aforementioned method may further include the step of disposing one or more shims between the base and the cradle.

The aforementioned method may further include the step of threading a strap through a channel defined by the back support to engage the base to another object.

The aforementioned method may further include the step of removably coupling a support foot to the base.

Additional examples and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

DETAILED DESCRIPTION

Aspects of the present disclosure relate to an apparatus and methods for improving the safety of a pet during travel. An apparatus as described herein may generally include a body defining a base; a cradle for receiving a torso portion of a pet where the cradle is configured for selective positioning and is removable from a predetermined position along the base; and a back support; the foregoing components positioned and oriented in an advantageous manner so as to assist with maintaining the pet in a fixed position (such as a sitting position) during travel. The apparatus further includes an adjustment system defined along the base and the cradle that adjusts a profile of the body to accommodate pets of varying sizes. The adjustment system may include, e.g., stackable paw pads, stackable shims, and the like.

In some examples, the apparatus further includes a restraining system such as a harness. The harness may define a plurality of harness members configured to wrap around portions of the pet, at least one opening for receiving a torso and/or neck of the pet, and a first tightening component to tighten one or more of the harness members about the pet. The restraining system may further include a second tightening component for bringing the harness (and the pet) in closer proximity to the body of the apparatus. In some examples, the apparatus further includes a channel for receiving a seat belt or other strap to temporarily anchor the body to the vehicle, as further described herein.

Figure 1:
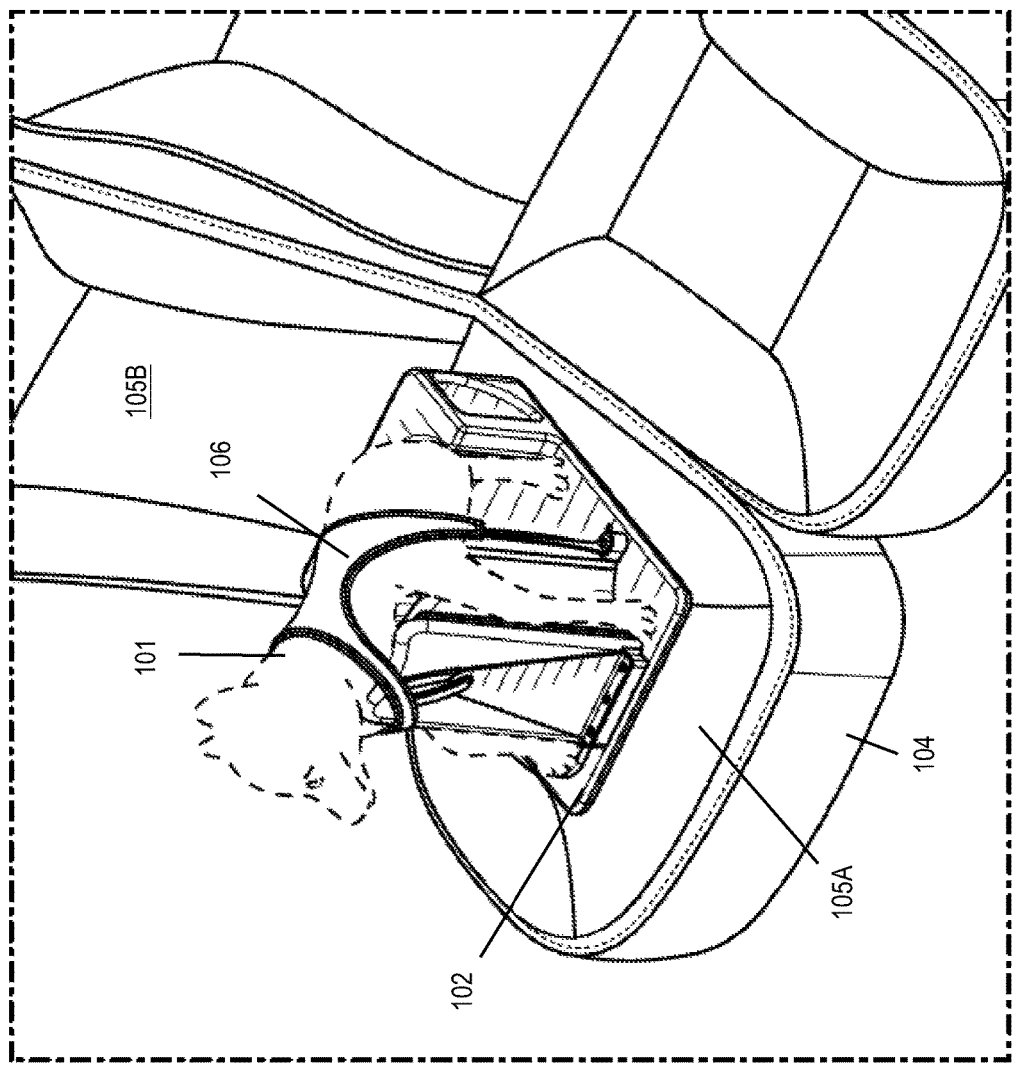
FIG. 1 is a perspective view of an exemplary apparatus for improving the safety of a pet during travel including a pet seat body and a harness that may be implemented to temporarily maintain the pet in a fixed position over the pet seat body.

Referring to FIG. 1, an exemplary implementation of the apparatus 100 is shown for improving the safety of a pet during travel or otherwise. The apparatus 100 includes a (pet seat) body 102 which may be positioned along a sitting portion 105A of a seat 104 or chair of a vehicle as shown or positioned in a similar orientation throughout other portions of the vehicle. A pet 101, which may include a dog, cat, or other such animal may be oriented in the sitting position depicted such that the pet 101 is facing away from a back portion 105B of the seat 104. A restraining system 106, as further described herein, may be engaged to the pet 101 to maintain the pet in the position shown relative to the body 102 of the apparatus 100 as further described herein. The implementation of the apparatus 100 shown is merely exemplary and it should be understood and appreciated that the body 102 of the apparatus 100 may be oriented to various different locations and/or positions within a vehicle while still providing the safety and comfort benefits further elaborated below.

Figure 2A:
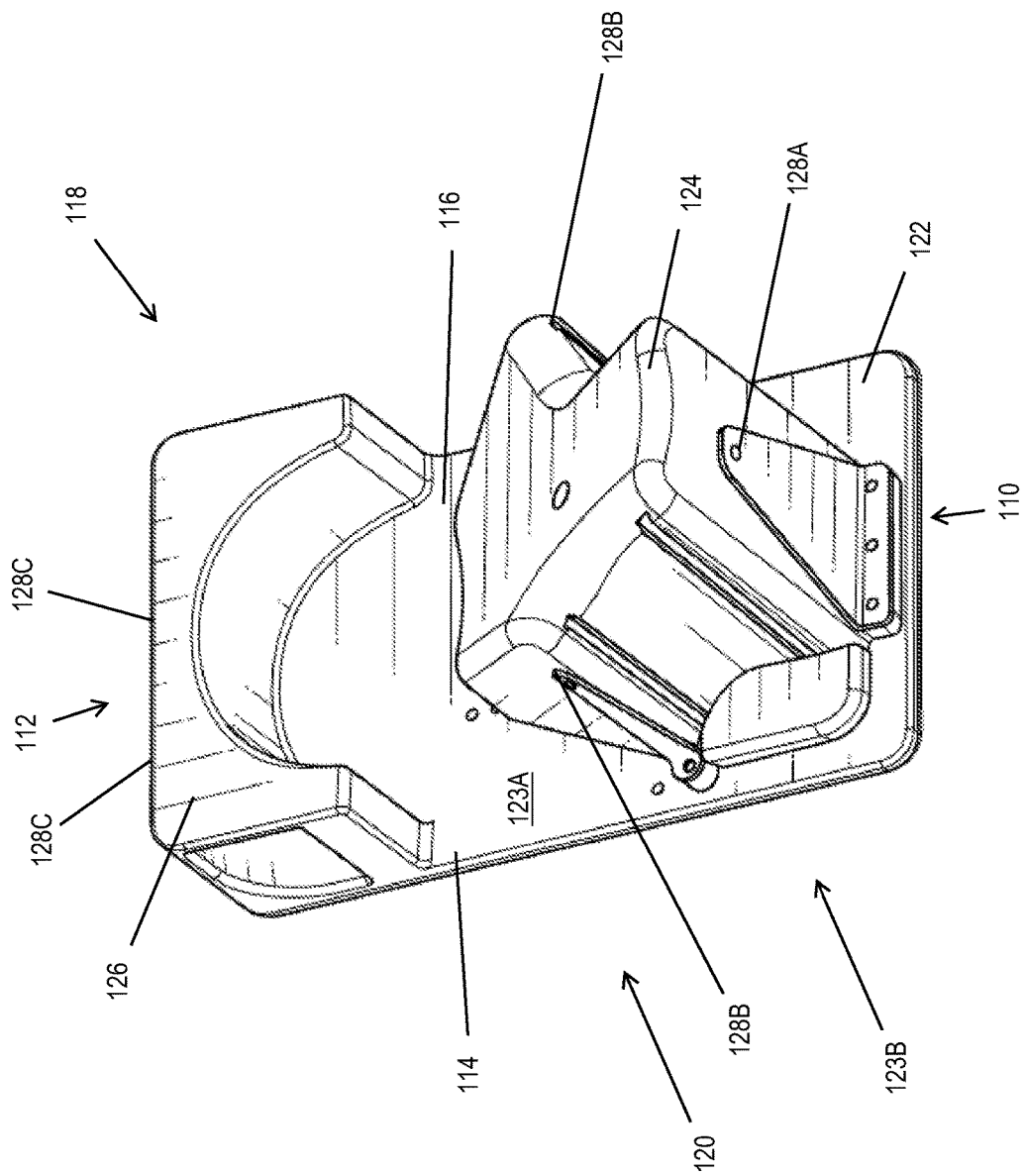
FIG. 2A is an isometric view of the pet seat body of FIG. 1.
Figure 2B:
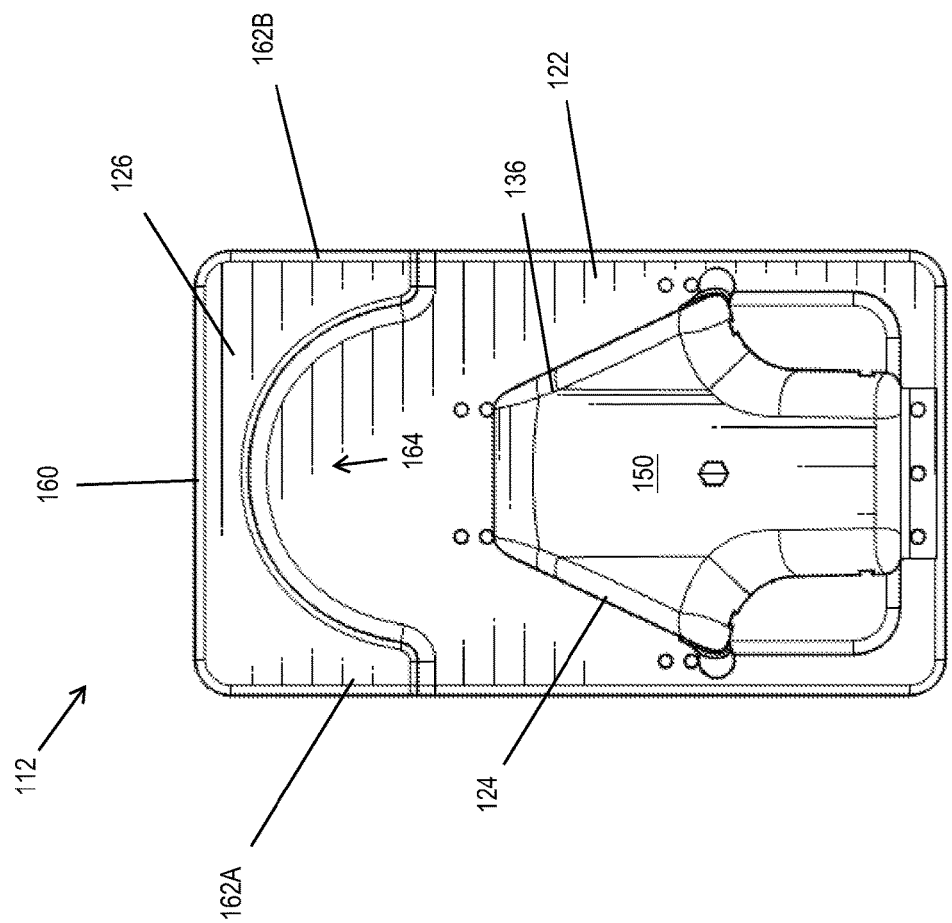
FIG. 2B is a top view of the pet seat body of FIG. 1.

Referring to FIGS. 2A-2B, the body 102 of the apparatus 100 generally defines a front side 110, a back side 112, a first lateral side 114, and a second lateral side 116. The body 102 may further define a top side 118 and a bottom side 120. As shown, examples of the body 102 may include a base 122, a cradle 124 positioned along the base 122 and extending from the front side 110, and a back support 126 positioned behind the cradle 124 along the back side 112 of the base 122. The body 102 is not limited to the components or the dimensions shown and it should be understood that like examples are contemplated.

As shown, the base 122 is generally defined along the bottom side 120 of the body 102. The base 122 may be substantially planar or flat, to support the cradle 124 and in some examples, the base 122 is generally rectangular in shape as depicted; however, the base 122 may comprise other shapes (circular, square-shaped, triangular-shaped, etc.) so long as the cradle 124 may be oriented along the base 122 as shown and described herein. As further shown, the base defines a first surface 123A oriented towards the top side 118 of the body 102, and a second surface 123B oriented towards the bottom side 120 of the body 102. The first surface 123A may be at least partially planar or flat to accommodate the positioning of the cradle 124 and the back support 126 along a common horizontal plane (not shown) defined by the base 122 as further described herein. In some examples, the second surface 123B may also be at least partially planar or flat so that the base 122 may stably rest on a seat, floor, or other surface of a vehicle.

In some examples, the body 102 includes various attachment points 128 such as the attachment point 128A, the attachment point 128B, and the attachment point 128C. The attachment points 128 may be used to fasten components of the restraining system 106 of FIG. 1 to the base 122 as further described herein. In the example shown, an attachment point 128A may be oriented along the front side 110 of the body 102. Attachment points 128B may be positioned in parallel along opposite sides of the cradle 124 as shown. Attachment points 128C may be positioned along the back side 112 of the body 102. The body 102 is not limited to the attachment points 128 shown and additional examples are contemplated which implement more or less of the attachment points 128 depending upon the example or dimensions of the restraining system 106 utilized with the body 102.

The attachment points 128 may define permanent or semi-permanent/non-permanent joints between the body 102 and portions of the restraining system 106 or other components. For example, in some examples as described herein, portions of the restraining system 106 may be permanently and mechanically joined to the base 122 at one or more of the attachment points 128, such as the attachment points 128B and 128C, using adhesive, nails, rivets, brazing, bolts, machine screws, cementing, welding, crimping, or other like methods and materials. In other examples, one or more of the attachment points 128 may define semi-permanent joints which may facilitate the temporary or semi-permanent attachment of the body 102 to portions of the restraining system 106. For example, the attachment point 128A may define a semi-permanent joint between the body 102 and a portion of the restraining system 106 using e.g. a general buckle, a snap-fit buckle, a side release buckle, a blimp buckle, a clasp, a belt buckle, Velcro, a hook-eye component, a button, a back closure, a belt hook, a snap, and the like.

Figure 3A:
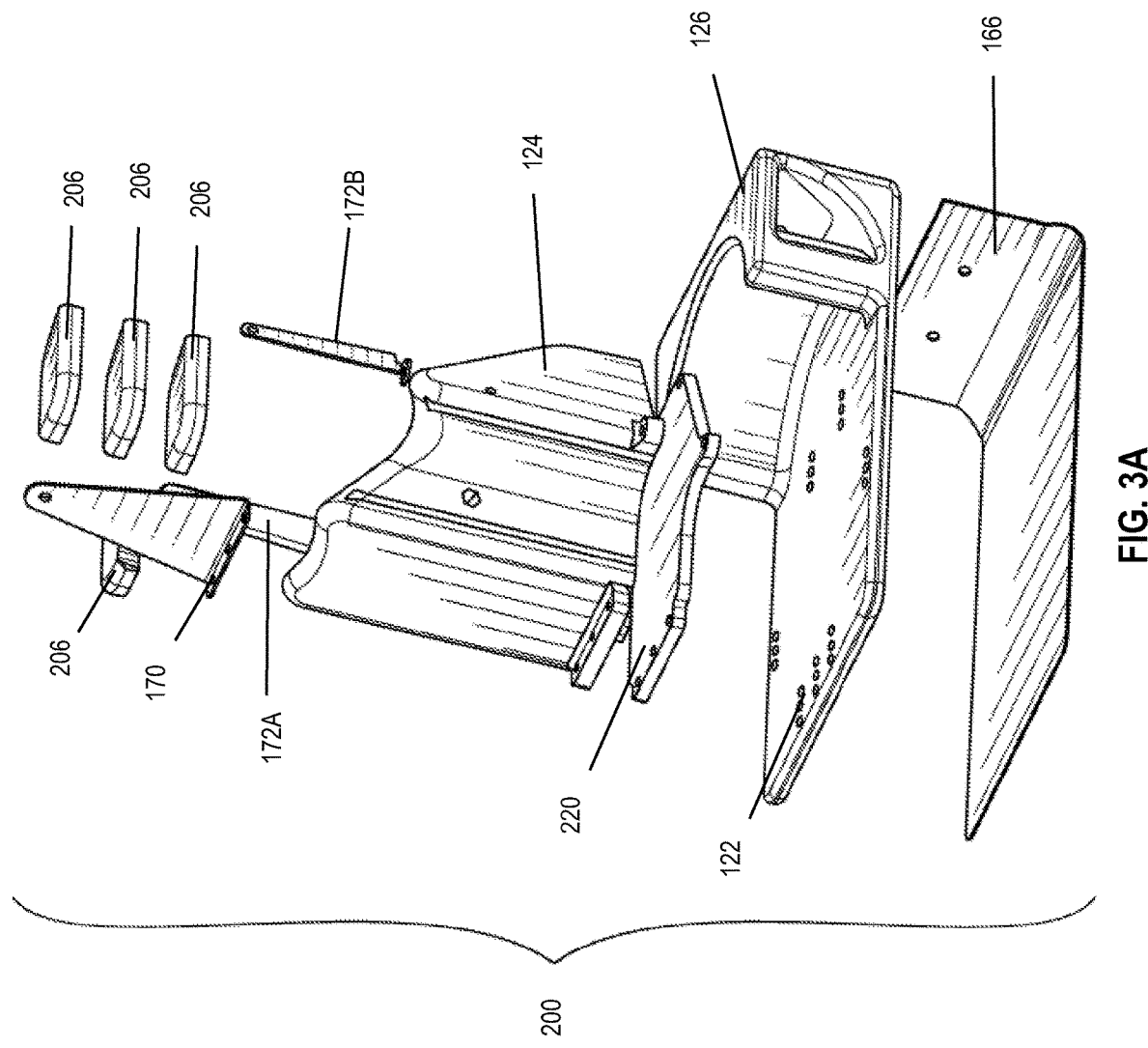
FIG. 3A is an exploded view of the pet seat body of FIG. 1 demonstrating different possible paw pad configurations and shim configurations.
Figure 3B:
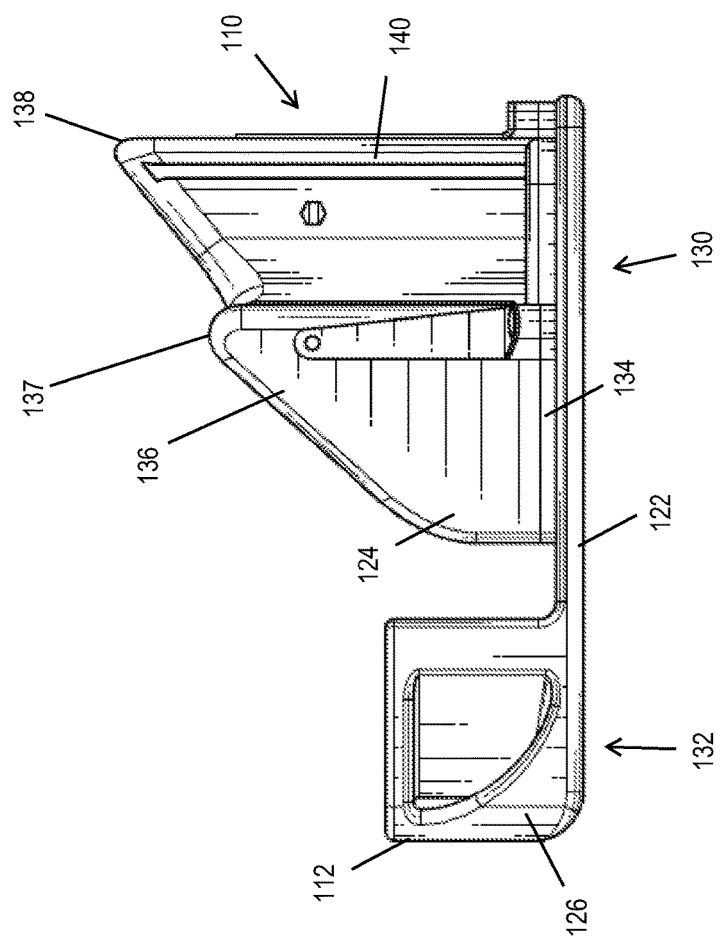
FIG. 3B is a side view of the pet seat body of FIG. 1 demonstrating different possible paw pad configurations.
Figure 3C:
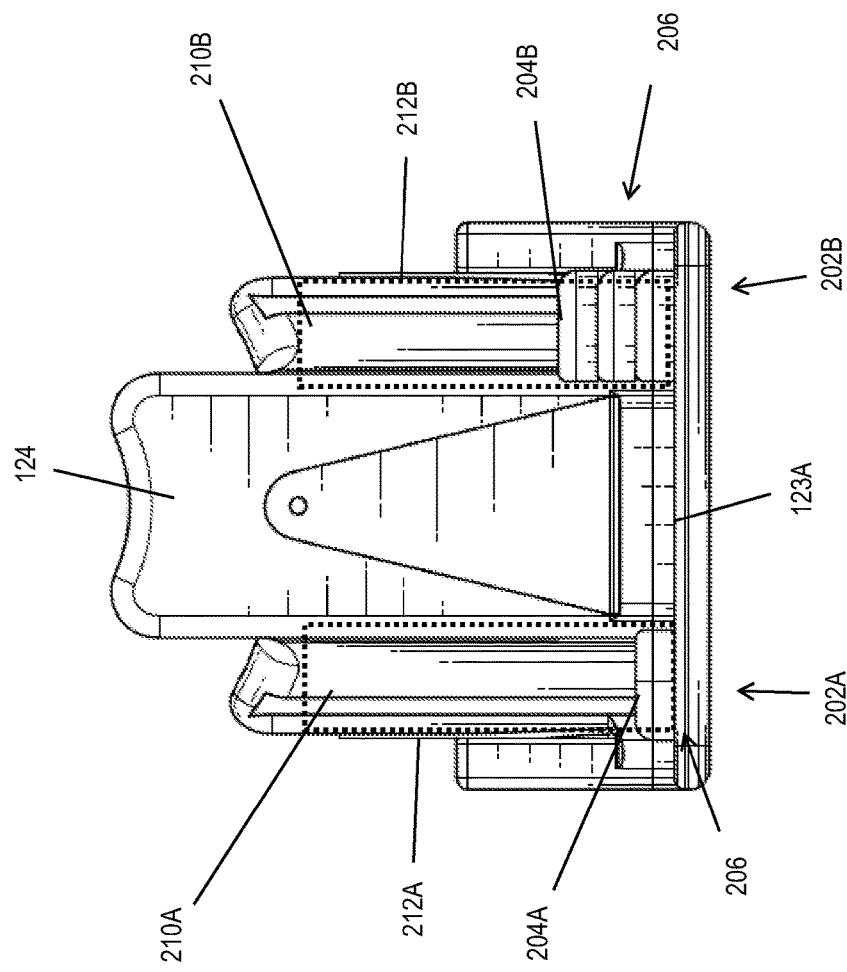
FIG. 3C is a front view of the pet seat body of FIG. 1 demonstrating different possible paw pad configurations.

Referring to FIGS. 3A-3C, with continuing reference to FIGS. 2A-2B, the cradle 124 of the body 102 may be positioned along the first surface 123A of the base 122 and generally defined along a first portion 130 of the base 122, a predetermined distance from the back side 112 of the body 102, whereas the back support 126 may be positioned along a second portion 132 of the base 122. The cradle 124 may also be generally centered between the first lateral side 114 and the second lateral side 116 of the body 102. The cradle 124 may define a horizontal portion 134 oriented along the first surface 123A of the base 122. As shown, the horizontal portion 134 may extend along the base 122 and may generally terminate at the front side 110 of the body 102.

In some examples, the horizontal portion 134 of the cradle 124 generally rests on the first surface 123A of the base 122, although intermediate components are contemplated in like examples (e.g., shims). The horizontal portion 134 may define a generally flat horizontal surface defined along the first surface 123A of the base 122. The cradle 124 may further define a first end positioned a predetermined distance from the back side 112 of the body 102, and a second end defined along the front side 110 of the body 102, such that the first end and the second end of the cradle 124 collectively define the horizontal portion 134 of the cradle 124.

The cradle 124 may further define an inclined portion 136 extending from the base 122 to an elevated position generally along the front side 110 of the body 102. The inclined portion 136 may define an inclined surface 137 for supporting a first portion of the pet 101, such as a torso portion. A predetermined acute angle (not shown) is defined between the intersection of the base 122 and/or horizontal portion 134 and the inclined portion 136. In some examples, the inclined portion 136 may terminate at the front side 110 of the body 102. In some examples, a terminal end 138 of the inclined portion 136 may define a dimple or other contouring to accommodate the upper chest and/or breastbone of the pet 101. Such a terminal end 138 may otherwise be referred to as a top end of the cradle 124.

The inclined surface 137 of the inclined portion 136 is configured to support or otherwise accommodate a general torso portion of the pet 101. Specifically, in some examples, the height of the terminal end 138 relative to the horizontal portion 134, designated H, and a length of the cradle 124 defined by the first portion 130, may both be predetermined and specially formed to accommodate the specific dimensions associated with the pet 101 (e.g. length of the pet's torso and height from the pet's feet to its breastbone in a sitting position) so that when the pet 101 is positioned over the cradle 124 and the base 122, the pet 101 naturally rests its breastbone or upper chest portion along the terminal end 138, and torso portions of the pet 101 naturally rest along the inclined surface 137 when the pet 101 is oriented in the position indicated in FIG. 1. Orienting the pet 101 in this manner using the novel inclined portion 136 of the cradle 124 and the elevated terminal end 138 described provides numerous advantages. For example, the inclined surface 137 provides a comfortable and stabilizing support surface which the pet 101 may lean or rest upon as opposed to standing upright by itself during travel. In addition, because the pet's breastbone or upper chest is generally a more rigid, stronger body part compared with other body parts of the pet 101, positioning the terminal end 138 along such portions of the pet 101 provides a safety contact point between the pet 101 and the apparatus 100, similar to the manner in which a shoulder safety belt is intended to wrap around the stronger upper chest portions of a human, or the manner by which a safety bar of a roller coaster is intended to contact the upper chest portions of a human. Conventional travel devices for pets lack such stabilization and comfort advantages.

As shown, the cradle 124 may further define a vertical portion 140. The vertical portion 140 may be defined along the front side 110 of the body 102. In some examples, the vertical portion 140 extends orthogonally from the horizontal portion 134 along the front side 110 of the body 102. In some examples, the vertical portion 140 is generally contiguous with the inclined portion 136 and the horizontal portion 134 as shown, such that the cradle 124 at least partially (or entirely) covers the first portion 130 of the base 122. The cradle 124 may further define contouring structure that may contour or otherwise provide additional comfort to the front legs of the pet 101. Additional such comfort features are contemplated.

In some examples, the cradle 124 may include a recess 150 (FIG. 2B) defined along the inclined portion 136 as shown. The recess 150 may be arcuate, i.e., the recess 150 may include curved or bowed surfaces to compliment and support the curvature of the stomach or other torso portions of the pet 101. When a torso portion of the pet 101 is rested or otherwise in contact against the inclined portion 136, the torso portion may be cradled along the inclined portion 136 and rest at least partially within the recess 150 which may provide additional stability of the pet 101 relative to the body 102 and otherwise increase the comfort of the pet 101.

As described and indicated herein, the cradle 124 may generally define a general three-dimensional (3-D) triangle-shape; however, the cradle 124 is not limited to this particular shape so long as the cradle 124 includes an inclined portion 136 as described for supporting the torso or like portions of the pet 101. Similar to the base 122, the cradle 124 may be formed or manufactured using cloth, foam, plastic, wood, leather, neoprene, vinyl, suede, metal, or combinations of the same. The cradle 124, base 122, and/or back support 126 may be formed separately and/or contiguously and may be formed with different shapes or sizes.

In some examples, the cradle 124 may be removable from the base 122. In such examples, the cradle 124 may be temporarily fastened to the base 122 in the orientation described using e.g. Velcro straps, clips, or other like fastening components implemented along the horizontal portion 134 to temporarily position the cradle 124 relative to the base 122 as described herein. As such, for example, a first cradle defining a set of first dimensions may be mounted to the base 122 to accommodate a first pet having a first size, and the first cradle may later be removed and replaced with a second cradle defining a different set of dimensions or generally defining a different size than the first cradle to accommodate a second pet of a different size than the first pet. In other examples, the cradle 124 may be manufactured together with the base 122 and the body 102 as a single unit. Specifically, for example, the cradle 124 and other parts of the body 102 may be formed using 3-D printing or similar methods, and the apparatus 100 may be customized for accommodating particular sized pets as further described herein.

In some examples, the vertical portion 140 of the cradle 124 may comprise e.g. a support member (not shown) extending from a predetermined point along the inclined portion 136 to the horizontal portion 134 to stabilize the terminal end 138 in a fixed position above the base 122. In some examples, the vertical portion 140 may be sufficient to maintain the terminal end 138 in the fixed position shown such that the cradle 124 may be devoid of a bottom side and/or may not include at least part of the horizontal portion 134 (i.e., the cradle 124 may define an opening (not shown) along the first surface 123A of the base 122). The vertical portion 140 may be in communication and flush with the base 122 as shown.

As shown, one example of the back support 126 may be formed or otherwise positioned along the back side 112 of the body 102 and along the base 122 behind the cradle 124. The back support 126 may define a back wall 160 extending in a vertical direction orthogonally from the base 122 along the back side 112 of the body 102, a first sidewall 162A oriented adjacent the back wall 160, and a second sidewall 162B oriented opposite the first sidewall 162A. The back wall 160, the first sidewall 162A, and the second sidewall 162B of the back support 126 may collectively define a pocket 164, which may take have a semi-circle profile as shown. During use, the rear portions of the pet 101, such as the rear legs and haunches, may be disposed within the pocket 164 such that the rear portions abut surfaces of the back wall 160, the first sidewall 162A, and the second sidewall 162B. In this manner, the back support 126 advantageously maintains the rear portions of the pet 101 in a fixed position relative to the base 122 during travel. In other examples, the back support 126 may be devoid of the first sidewall 162A and/or the second sidewall 162B (and the pocket 164) and may just include the back wall 160, such that the rear portion of the pet 101 simply rests along or is otherwise stabilized by the back wall 160.

As indicated in FIG. 3A, in some examples of the apparatus 100 the back support 126 may be formed integrally with the base 122 as a single common component. In addition, the body 102 may include a base bracket 166 providing additional support for the base 122. The body 102 may further include a plurality of structural reinforcing components. Specifically, examples of the body 102 include a front brace 170 positioned along the front side 110 of the body against the cradle 124, a first side brace 172A positioned on one side of the cradle 124, and a second side brace 172B positioned on another side of the cradle 124 as shown. The front brace 170, and the first and second side braces (172A, 172B) can be used to tie the base 122, cradle 124, and restraining system 106 attachment points (128) all together and reinforce transfer of energy from the restraining system 106 to a car seat belt and/or car set anchors (described below).

In addition, examples of the body 102 include an adjustment system 200 defined by one or more of a plurality of components and variable configurations. In general, the adjustment system 200 allows adjusts a profile of the body 102 to accommodate pets of varying sizes. The adjustment system 200 may include one or more (paw) pad configurations 202 (FIG. 3C), indicated as pad configuration 202A and pad configuration 202B positioned along the first surface (123A) of the base 122 and abutting the cradle 124 as shown. In turn, each of the pad configurations 202 defines a (paw) contact surface positioned over the base 122, designated as contact surface 204A and contact surface 204B. The contact surfaces 204 receive front paws of the pet 101 engaged to the apparatus 100; i.e., the front paws rest along the contact surfaces 204 during use. As indicated in FIGS. 3A-3C, each of the contact surfaces 204 defines a variable height. Specifically, in some examples, the height of each contact surface 204 can be adjusted by the amount of (paw) pads 206 positioned along the pad configurations 202. Pads 206, as shown, generally define modular stackable components that may be positioned along the pad configurations 202. As demonstrated in FIG. 3C, each of the pad configurations 202 may include one or more pads 206; or any pad configuration 202 may be devoid of pads 206 (for larger pets and/or longer pet legs). The pads 206 may include conforming bottom and top surfaces so that the pads 206 can be stacked tightly and flush as shown. As demonstrated in the non-limiting example of FIG. 3C, the pad configuration 202B includes three pads 206, and the pad configuration 202A includes a sole pad 206. Accordingly, in this example, the pad configuration 202B would define a contact surface 204B with a height greater than the contact surface 204A of the pad configuration 202A, by nature of the additional pads 206 implemented in pad configuration 202B.

In addition, in various examples, the cradle 124 defines a pair of grooves 210 defined along opposite lateral ends of the cradle 124, designated as groove 210A and groove 210B. Each of the grooves 210 define a respective slot 212, shown in dashed lines in FIG. 3C and designated as slot 212A and slot 212B. In general, the slots 210, formed by structure of the cradle 124 along the grooves 210, are shaped to receive and maintain the pads 206 along respective pad configurations 202. For example, to apply the sole pad 206 to form the pad configuration 202A, a pad 206 may be positioned over the slot 210A and passed along the slot 210 to rest along the base 122. Additional pads 206 may be similarly passed to within the slot 210A and implemented with the pad configuration 202A as described to e.g., replicate the three-pad configuration of pad configuration 202B shown. In some examples, the slots 210 may be completely filled with pads 206 for smaller pets.

Figure 8A:
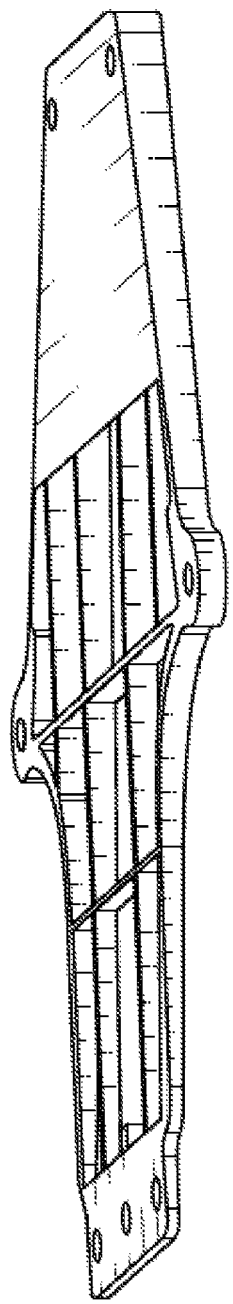
FIGS. 8A-8B are perspective views of exemplary shims which may be implemented in the apparatus of FIG. 1.
Figure 8B:
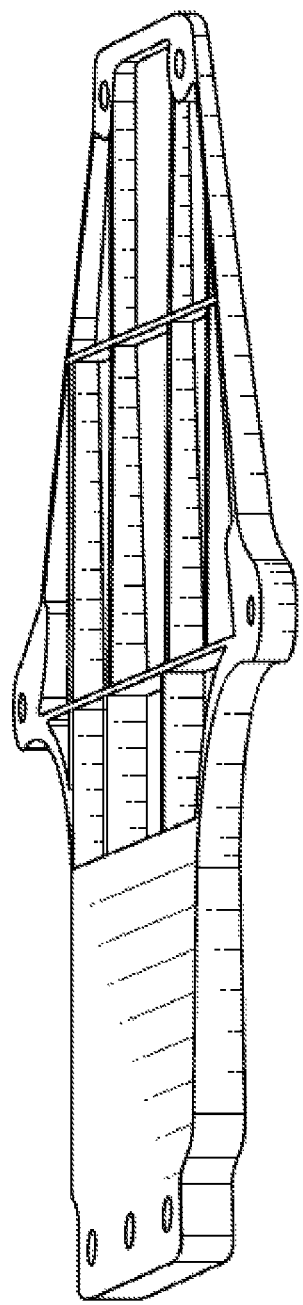

As further shown in FIG. 3A, the adjustment system 200 may further include one or more shims 220 positioned between the cradle 124 and the base 122. The shims 220 may be installed and may be removable from different predetermined locations along the base 122, and held in place by bolts, or other fasteners (e.g., shims 220 may index on bolts that hold the cradle 124 to the base 122). Like the pads 206, the shims 220 may be stackable under the cradle 124 to increase a total size of the body 102 for larger sized pets. The shims 220 may generally define a shape configuration that is flush below a footprint of the cradle 124. In other examples, the shims 220 may be tapered to modify an angle of the inclined portion 136 of the cradle 124 relative to the base 122 (examples of tapered shims shown in FIGS. 8A-8B).

In addition, as part of the adjustment mechanism 200, the cradle 124 may be removable from the position shown in FIG. 2B and shifted towards the back support 126 to accommodate pets of different sizes and dimensions. The back support 126 may also be removable in other examples. Any of the aforementioned components may be removably engaged using Velcro or other such temporary fastening measures. The base 122 may be formed with a greater thickness, and or additional shims may be stacked between the base bracket 166 and the base 122 to effectively increase a height of the base 122. The aforementioned mechanisms and components of the adjustment system 200 provide enhanced flexibility for the apparatus 100 to accommodate pets large or small and provide adaptability. For example, implementing shims 220, and/or adjusting the height of the base 122 relative to the base bracket 166 can allow a smaller pet to view outside of a vehicle window when engaged to the apparatus 100, providing comfort to the animal (without requiring a separate implementation/purchase of a smaller like apparatus).

Figure 4A:
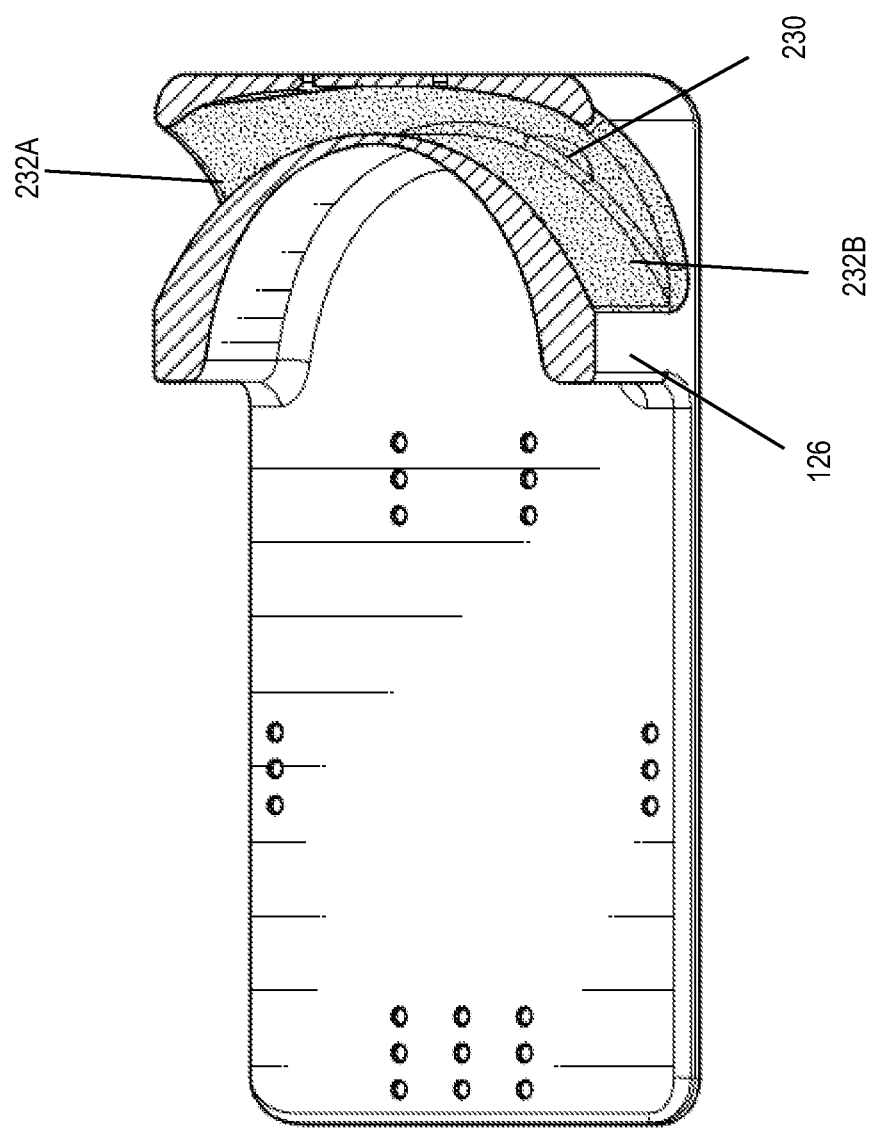
FIG. 4A is a top view of a portion of the pet seat body of FIG. 3A illustrating an exemplary channel for a car seat anchor which may be implemented in examples of the subject pet seat body with a portion cut-away to further illustrate the path of the channel.
Figure 4B:
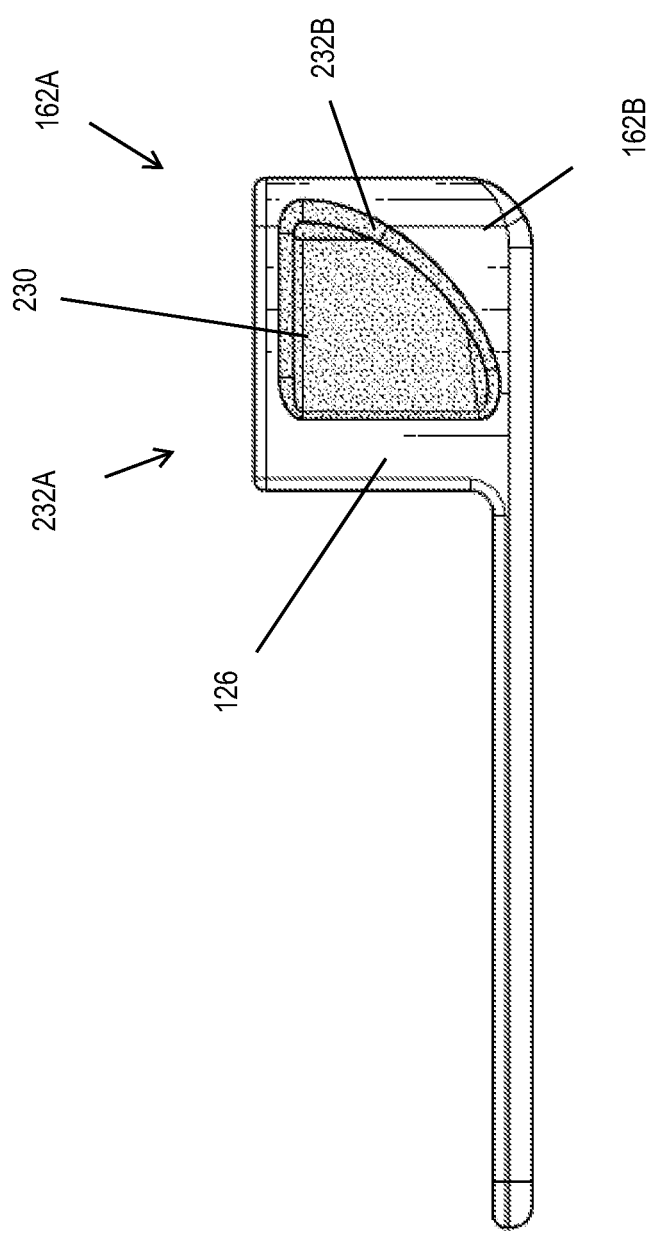
FIG. 4B is a side view of the portion of the pet seat body of FIG. 3A further illustrating the exemplary channel for a car seat anchor.
Figure 4C:
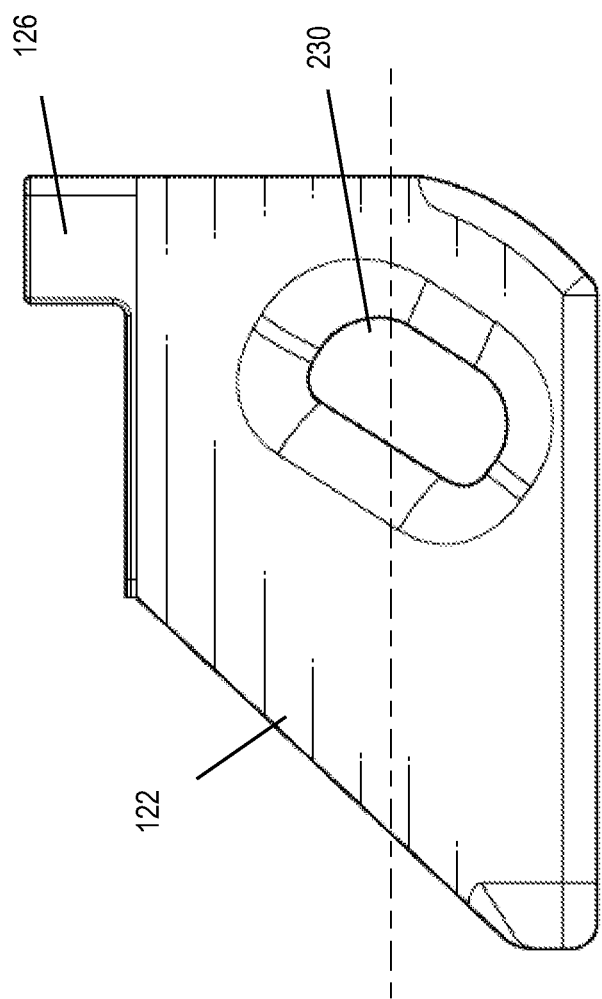
FIG. 4C is a side view of another example of the apparatus of FIG. 1 with a different base configuration and modification to the channel of FIG. 4A.
Figure 4D:
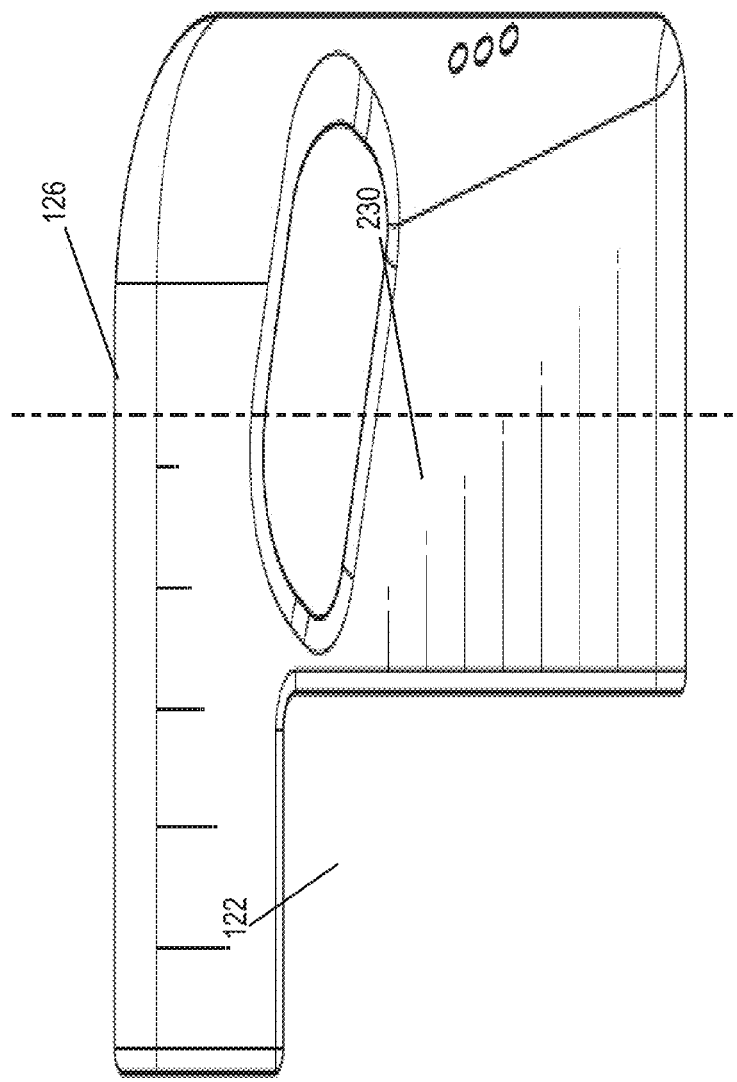
FIG. 4D is a side view of another example of the apparatus of FIG. 1 with a different base configuration and modification to the channel of FIG. 4A.

Referring to FIGS. 4A-4B, examples of the apparatus 100 may include a channel 230 formed through the back support 126 or other portion of the body 102 for receiving an elongated member such as a seatbelt, strap, or other member to maintain the apparatus 100 in a fixed position during travel. The channel 230 is in communication with an opening 232A formed along the first sidewall 162A, and an opening 232B formed along the second sidewall 162B. As shown, the channel 230 may be fully enclosed and border and/or extend around the pocket 164 of the back support 126. When receiving a seatbelt of a vehicle, the channel 230 ensures that the body 102 is secured to the vehicle regardless of vehicle belt tension or unconventional force directions from impact. As an example, a seatbelt along the seat 104 of FIG. 1 may be threaded through the channel shown behind the pet. FIG. 4C illustrates a different example of the body 102 where the base 122 includes an increased thickness for smaller pets. In this example, the channel 230 is formed through the base 122 away from the back support 126. FIG. 4D illustrates an example similar to the example in FIG. 4C with a different shape configuration.

Figure 5:
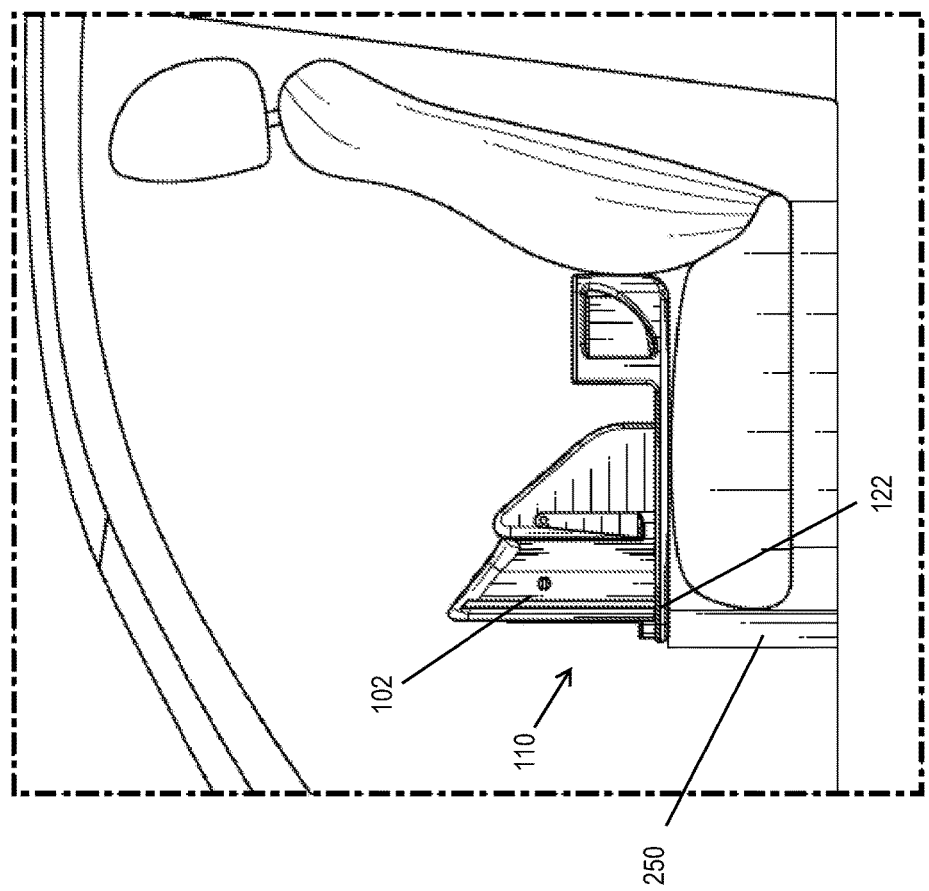
FIG. 5 is a side view of an example of the apparatus of FIG. 3A including an adjustable foot support.

Referring to FIG. 5, examples of the apparatus 100 may further include a support foot 250 extending from the base 122 along the front side 110 of the body 102 that reduces movement of the body 102 relative to a vehicle seat, and also provides support for pets with longer legs. For example, a larger dog's legs will overhang over most car seats, and the support foot 250 provides additional stability for the dog and comfort. A length of the support foot 250 is adjustable; e.g., the support foot 250 may include a telescoping configuration.

Figure 6:
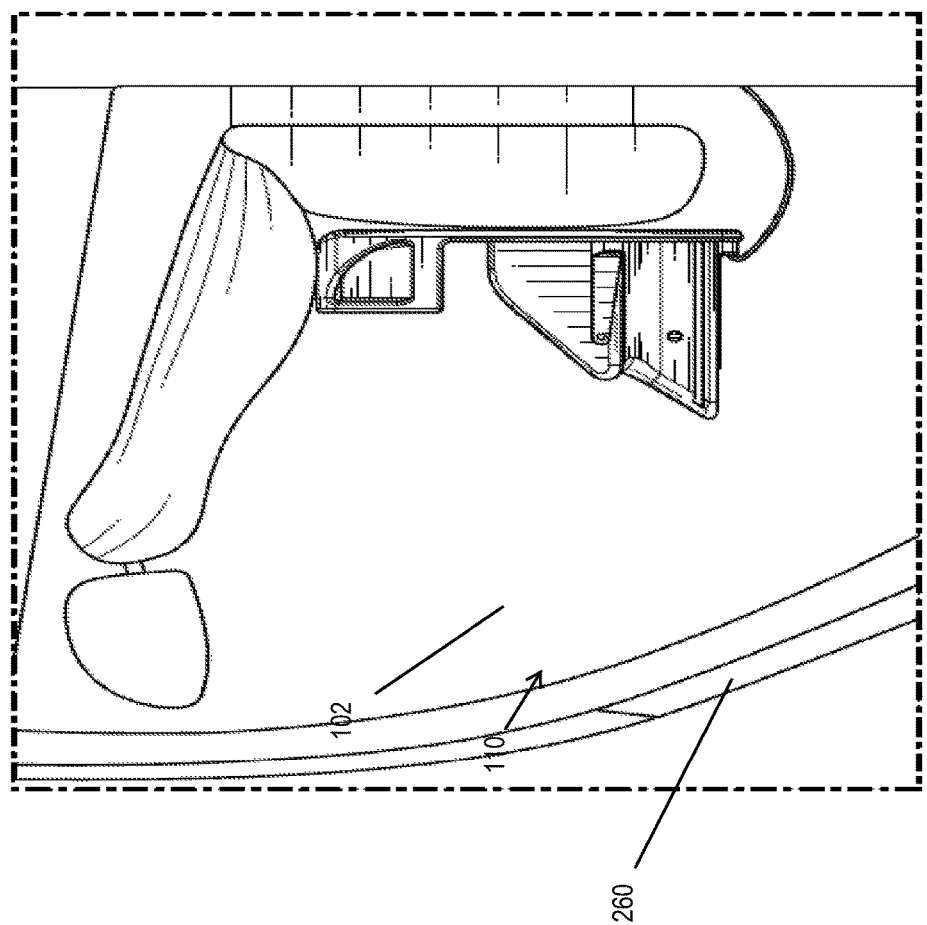
FIG. 6 is a side view of an example of the apparatus of FIG. 3A including an anti-tilt strap.

Referring to FIG. 6, examples of the apparatus 100 may further include a strap 260 coupled to the front side 110 of the body 102 and configured to engaged with a portion of the vehicle to reduce tilting of the body 102. In other words, the strap 260 may define an anti-tilt strap that prevents upward rotation.

Figure 7:
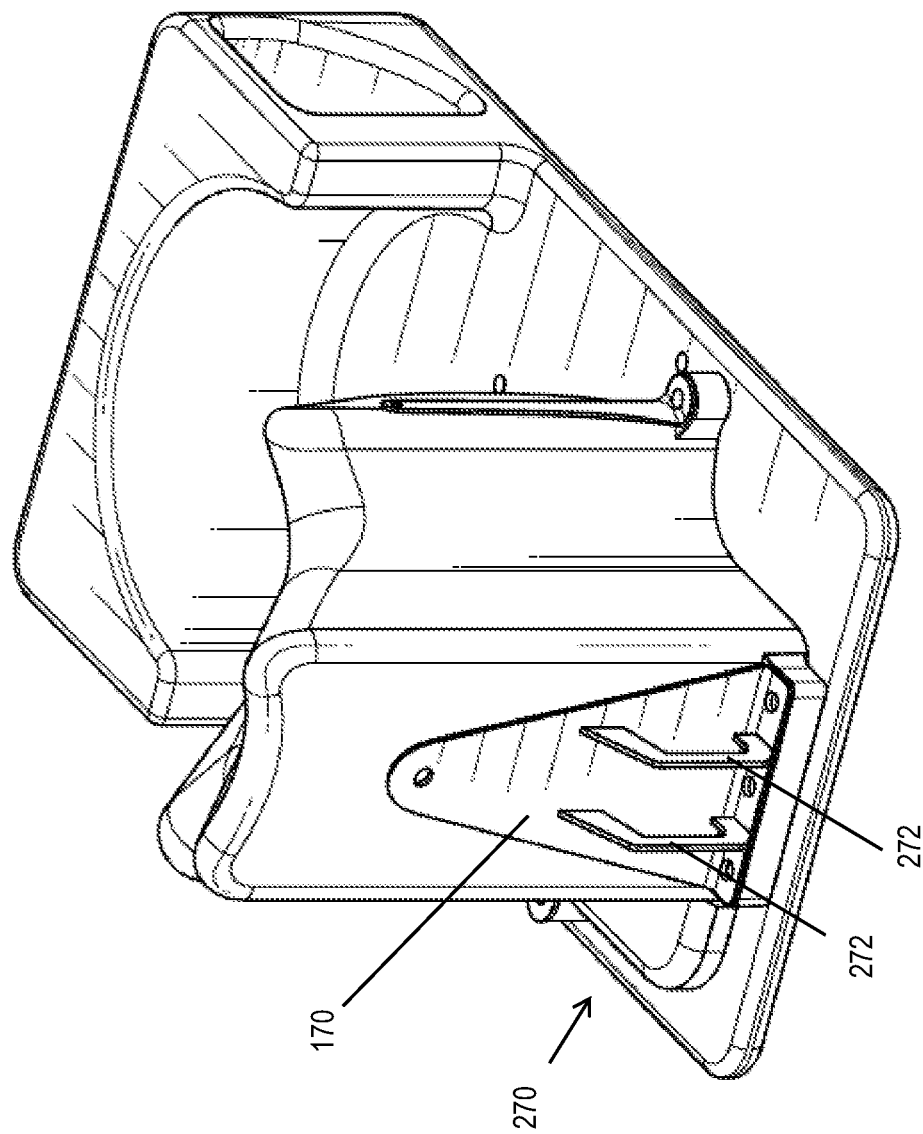
FIG. 7 is a perspective view of an example of FIG. 3A including a belt loop formed along the front side of the body.

Referring to FIG. 7, examples of the apparatus 100 may further include a belt loop 270 that may be formed along the front brace 170. The belt loop 270 as shown may include one or more belt loop members 272, and a belt, strap, or other such member may be threaded throw the belt loop members 272 to maintain the body 102 in a fixed position relative to a vehicle or other external structures.

The design of the apparatus 100 ensures lateral longitudinal and vertical stability for the animal not only in the event of an impact but also during regular vehicle operation to include extreme upset such as rough marine travel, auto racing, off road use, acrobatic and other aerial maneuvers. The seat (body 102) utilizes a natural yet secure position for the animal, not suspended or sprawled out, and supports and contains the animal at the strongest points of their skeletal structure while distributing any loads across a large surface area. For example, a canine can support itself in the sitting position on its paws and hind end or rest its weight on the entire chest belly and hind area as if laying down without changing position.

Components of the apparatus 100 may be manufactured using lightweight plastic or composite rigid construction either molded or printed for a stronger seat profile, and portions of the body 102 (e.g., the inclined portion 136) may include complex curves for better ergonomics, comfort, and safety. Any components of the apparatus 100 such as the pads 206 may include machine washable covers/padding quick to install and remove that may include fast drying stain resistant materials.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various examples, it should be understood that these examples are illustrative and that the scope of the disclosure is not limited to such examples. Many variations, modifications, additions, and improvements are possible. More generally, examples in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. An apparatus for improved safety of a pet during travel, comprising:
   a body defining a front side, a back side opposite the front side, a top side, a bottom side opposite the top side, and lateral sides including a first lateral side adjacent the front side and a second lateral side opposite the first lateral side, the body comprising:
   a base defined along the bottom side of the body,
   a back support defined along a back side of the body opposite the front side,
   a cradle positioned along the base configured to support a general torso portion of a pet, the cradle defining an inclined surface between the front side and the back side, and
   an adjustment system defined along the base and the cradle that adjusts a profile of the body to accommodate pets of varying sizes,
   wherein the adjustment mechanism includes:
   a shim positioned between the cradle and the base, the shim being removable and stackable with other shims.

2. The apparatus of claim 1, wherein the adjustment system includes:
   a plurality of pad configurations positioned along a surface of the base and configured to support paws of the pet, each of the plurality of pad configurations including at least one pad defining a paw contact surface over the base.

3. The apparatus of claim 2, wherein the at least one pad of the plurality of pad configurations is configured to receive at least one additional pad to increase a height of the paw contact surface relative to the base.

4. The apparatus of claim 2, wherein the one or more pads are received along slots defined by grooves of the cradle.

5. An apparatus for improved safety of a pet during travel, comprising:
   a body defining a front side, a back side opposite the front side, a top side, a bottom side opposite the top side, and lateral sides including a first lateral side adjacent the front side and a second lateral side opposite the first lateral side, the body comprising:
   a base defined along the bottom side of the body,
   a back support defined along a back side of the body opposite the front side,
   a cradle positioned along the base configured to support a general torso portion of a pet, the cradle defining an inclined surface between the front side and the back side, and
   an adjustment system defined along the base and the cradle that adjusts a profile of the body to accommodate pets of varying sizes,
   wherein the adjustment mechanism includes:
   a shim positioned between the cradle and the base, the shim being removable and stackable with other shims, and
   wherein the shim is tapered to modify an angle of the inclined surface of the cradle relative to the base.

6. The apparatus of claim 1, wherein the shim is configured to receive an additional shim over the shim to increase a height of the inclined surface relative to the base.

7. The apparatus of claim 1, further comprising:
   a channel formed through a portion of the body that receives an elongated member to maintain the body in a fixed position relative to a portion of a vehicle.

8. The apparatus of claim 7, wherein the channel is in communication with a plurality of openings formed along the back support.

9. The apparatus of claim 1, further comprising:

a restraint system positioned over the body configured to maintain the pet in a fixed position relative to the body, the restraint system including a plurality of connection members that engage with respective mounting points of the base.

10. An apparatus for improved safety of a pet during travel, comprising:

a body defining a front side, a back side opposite the front side, a top side, a bottom side opposite the top side, and lateral sides including a first lateral side adjacent the front side and a second lateral side opposite the first lateral side, the body comprising:

a base defined along the bottom side of the body, a back support defined along a back side of the body opposite the front side, a cradle positioned along the base configured to support a general torso portion of a pet, the cradle defining an inclined surface between the front side and the back side, and an adjustment system defined along the base and the cradle that adjusts a profile of the body to accommodate pets of varying sizes wherein the cradle is removably coupled to the base and is configured for selective positioning along a predetermined portion of the base.

11. The apparatus of claim 1, further comprising a pair of side braces positioned along the body, each of the pair of side braces positioned along a lateral side of the cradle.

12. The apparatus of claim 1, further comprising:

an anti-pitch strap extending along the front side of the body that prevents upward rotation of the body during transport of the pet.

13. The apparatus of claim 1, further comprising:

a support foot extending from the base along the front side of the body that reduces movement of the body relative to a vehicle seat.

14. The apparatus of claim 1, further comprising:

a strap coupled to the front side of the body configured to engaged with a portion of the vehicle to reduce tilting of the body.

* * * * *